United States Patent [19]

Katsurayana

[11] 4,017,900
[45] Apr. 12, 1977

[54] TAPE RECORDER CASSETTE EJECTING DEVICE

[75] Inventor: Hiromasa Katsurayana, Nagoya, Japan

[73] Assignee: Shin-Shirasuna Electric Corporation, Nagoya, Japan

[22] Filed: July 22, 1975

[21] Appl. No.: 597,997

[52] U.S. Cl. .................................. 360/137; 360/96
[51] Int. Cl.² ........................................ G11B 23/04
[58] Field of Search ............... 360/137, 93, 94, 95, 360/96

[56] References Cited

UNITED STATES PATENTS

| | | | |
|---|---|---|---|
| 3,820,158 | 6/1974 | Schober | 360/96 |
| 3,867,722 | 2/1975 | Syohji | 360/96 |
| 3,893,186 | 7/1975 | Yoshii | 360/96 |
| 3,902,194 | 8/1975 | Segawa | 360/96 |
| 3,902,681 | 9/1975 | Boehme | 360/96 |

Primary Examiner—Jay P. Lucas
Attorney, Agent, or Firm—Bacon & Thomas

[57] ABSTRACT

A cassette tape recorder comprising a cassette eject mechanism designed so that a cassette receptacle is positively pivotally moved, by depressing an eject key, to an inclined position where a cassette can be inserted thereinto or removed therefrom, and a safety mechanism for preventing the eject key from being depressed when a playback key is depressed and for preventing the playback key from being depressed when said receptacle assumes the inclined position. The aforementioned cassette eject mechanism also includes cassette push-out means which is so designed as to be actuated by the depression of the eject key at the time when said cassette receptacle has substantially reached said position, thereby pushing said cassette partially out of said receptacle.

2 Claims, 12 Drawing Figures

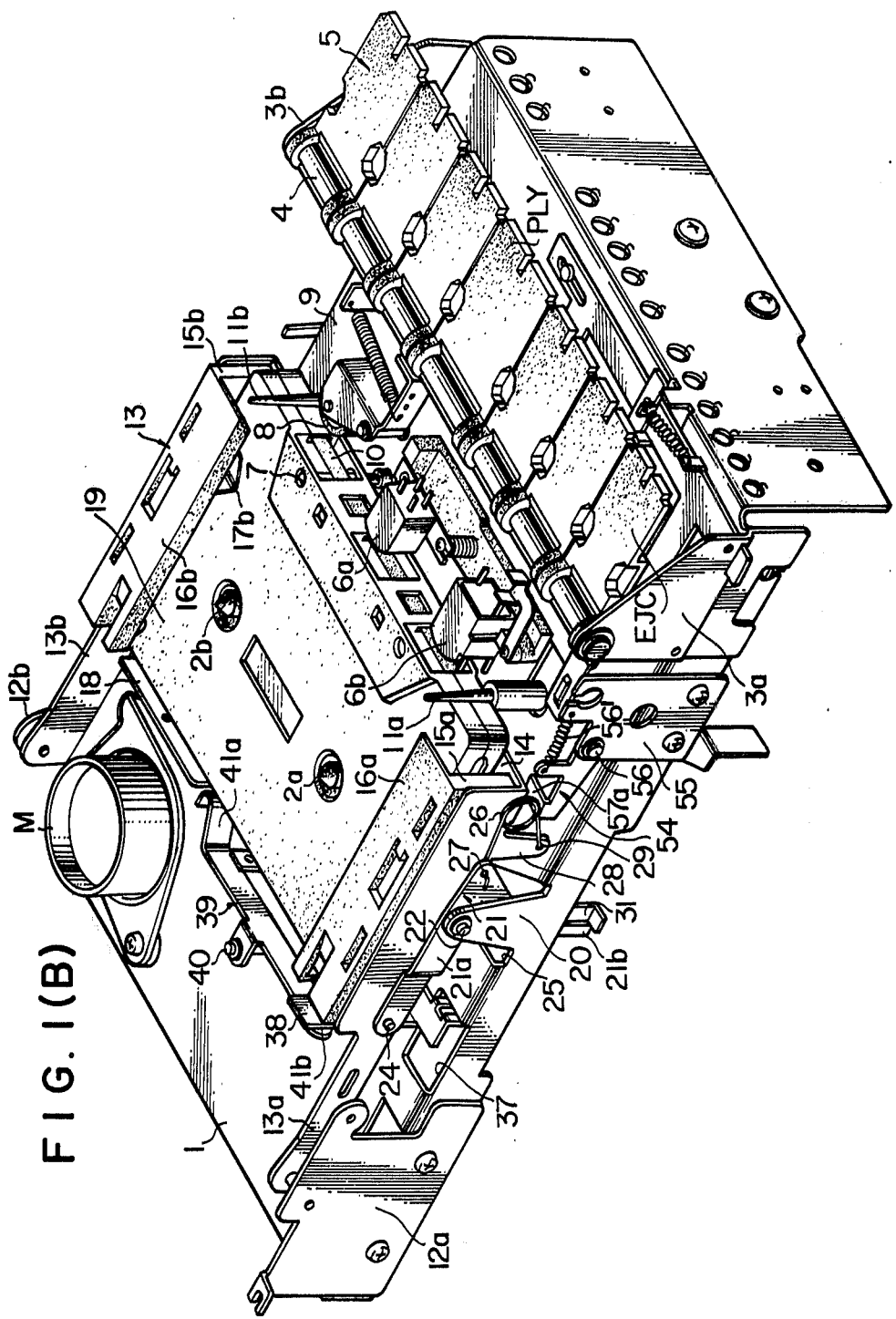
FIG. I(B)

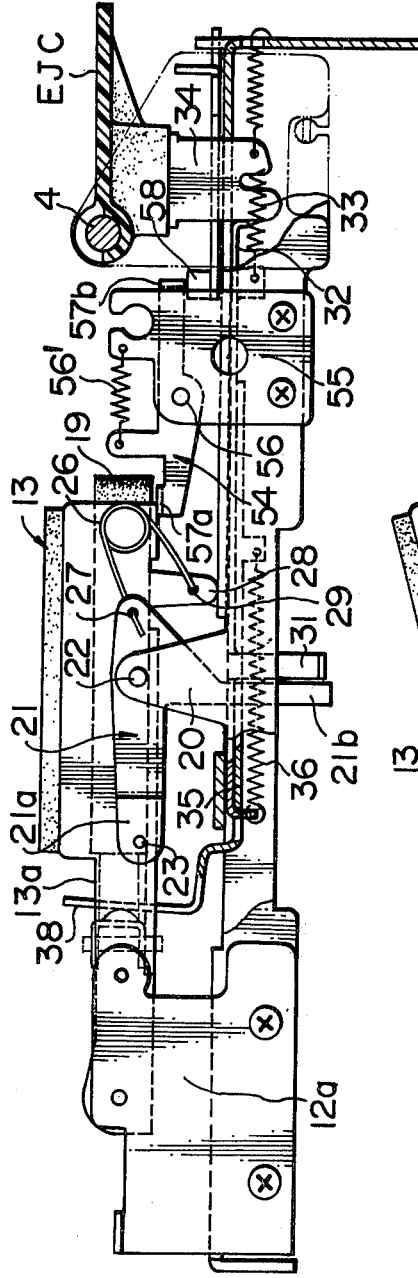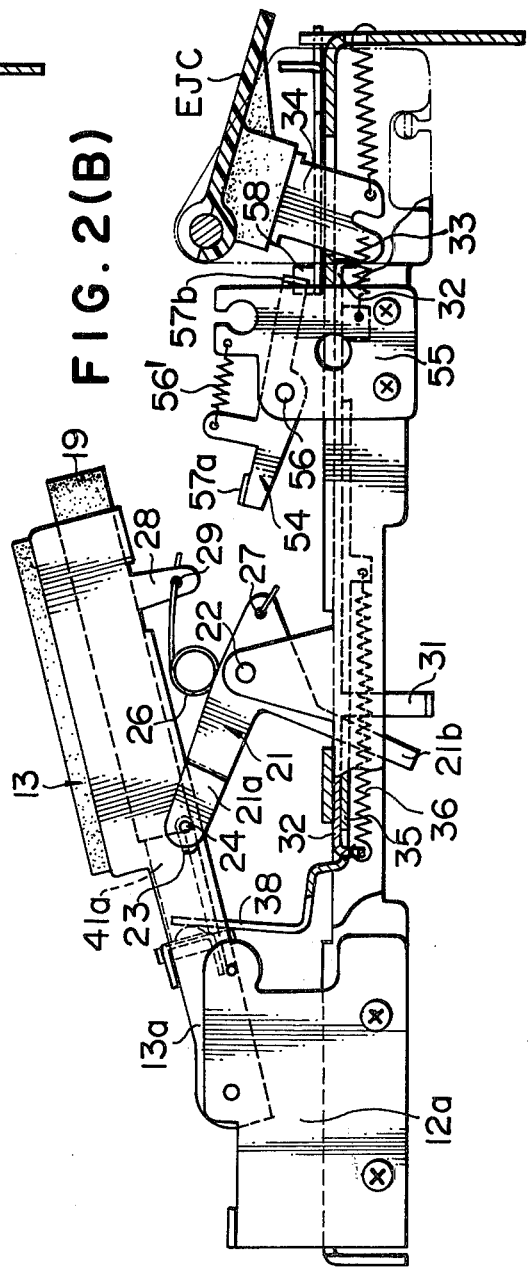

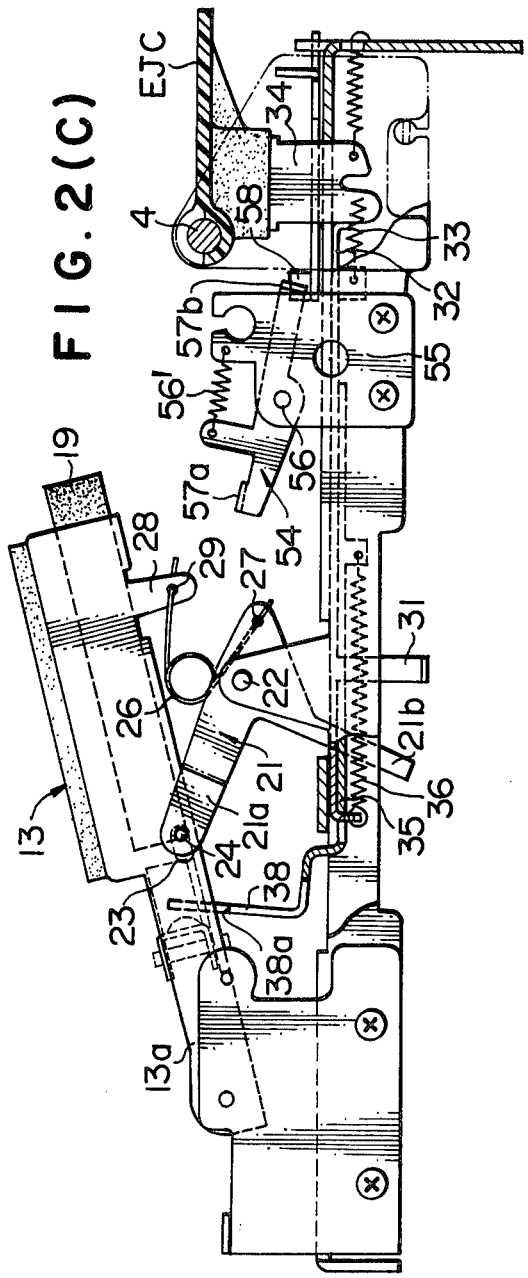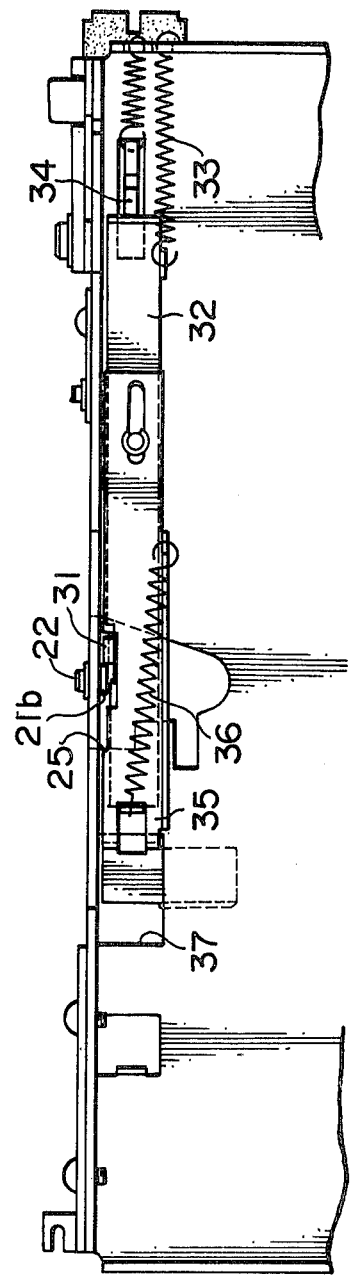

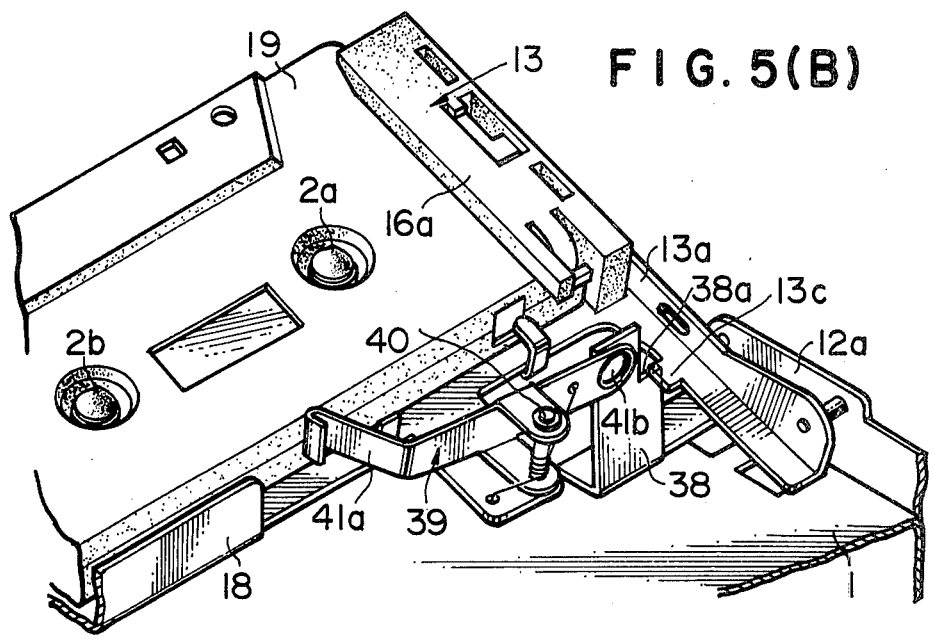
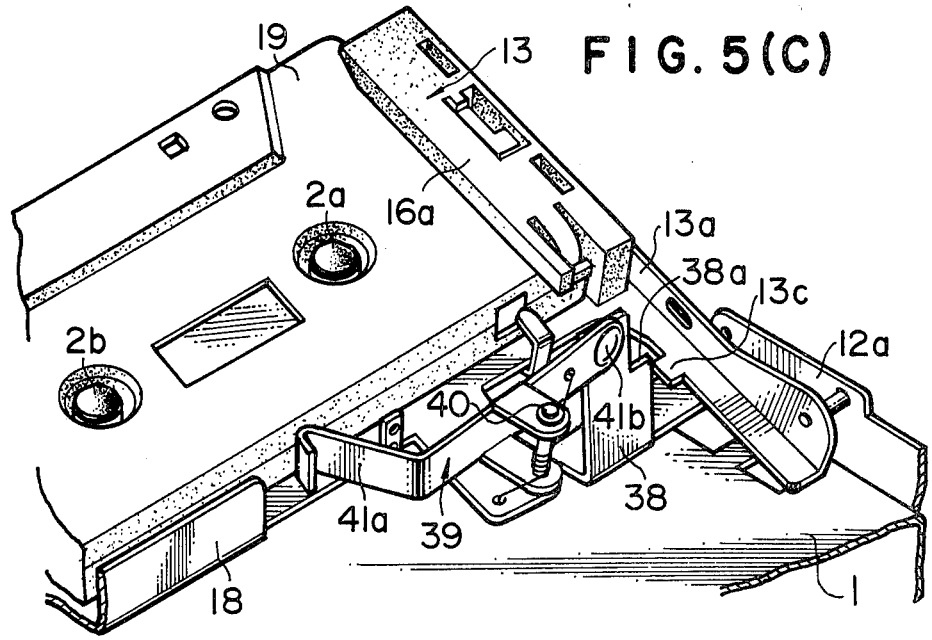

TAPE RECORDER CASSETTE EJECTING DEVICE

BACKGROUND OF THE INVENTION

1. Field of the Invention

This invention relates to a cassette tape recorder, and more particularly it pertains to a cassette tape recoder comprising a cassette eject mechanism designed so that a cassette receptacle is positively pivotally moved, by depressing an eject key, to an inclined position where a cassette can be inserted into or removed from the receptacle, and a safety mechanism for preventing the eject key from being depressed when playback key is depressed and for preventing the playback key from being depressed when the cassette receptacle assumes the inclined position.

2. Description of the Prior Art

In the case of the conventional cassette eject mechanism, an elongated coil spring is used, and the axial spring force thereof is utilized to cause a cassette receptacle to be resiliently cocked to the aforementioned inclined position. With such an arrangement, however, there is a tendency that before the receptacle is fully cocked, an undesirable balance of force may be established between the aforementioned spring and the cassette receptacle for some reason, with a result that the receptacle is stopped half-way. In an attempt to take the cassette out of the receptacle while the latter is at such a halfway position, it is necessary to manually push up the receptacle per se further. Moreover, should the cassette be pushed out of the receptacle which is stopped half-way as mentioned above, not only the cassette but also the heads could possibly be damaged.

SUMMARY OF THE INVENTION

Accordingly, it is an object of this invention to provide a cassette eject mechanism enabling the cassette receptacle to assume, without fail, a position where a cassette can readily be removed therefrom, simply by depressing the eject key.

Another object of this invention is to provide a cassette push-out mechanism operable by the depression of the eject key to push the cassette partially out of the receptacle when the latter has substantially reached the inclined position.

Generally, such a type of tape recorder is arranged such that magnetic heads are brought into contact with a magnetic tape in the cassette by depressing the playback key. With such an arrangement, therefore, it is necessary to prevent the eject key from being depressed when the playback key is in the depressed position. Otherwise, not only the cassette but also the heads will be damaged due to the cocking of the receptacle containing the cassette with the magnetic tape being contacted by the magnetic heads. It is also necessary to prevent the playback key from being depressed while the cassette receptacle assumes the cocked position. Otherwise, if the cassette receptacle is erroneously depressed when the magnetic heads are positioned therebelow, then the cassette contained therein will collide with the magnetic heads, thus causing trouble.

Therefore, still another object of this invention is to provide a safety mechanism for preventing depression of the eject key when the playback key is locked in the depressed position and for preventing the playback key from being depressed when the cassette receptacle assumes, as a result of depression of the eject key, the cocked or inclined position where the cassette can be inserted into or removed from the cassette receptacle.

The cassette eject mechanism according to this invention includes resiliently operable actuator means associated with the cassette receptacle. The actuator means is so designed as to assume a first position when the cassette receptacle is at the inclined position where a cassette can be inserted into or removed from the receptacle and a second position when the receptacle assumes a position substantially parallel to the chassis where the cassette contained in the receptacle is mounted on reel spindles. When the actuator means is at the second position, if the eject key is depressed, the actuator means will be displaced, while rotating, from the second position to the first position, whereby the cassette receptacle will be cocked up to the aforementioned inclined position. The eject mechanism also includes cassette push-out means adapted to be operated by the depression of the eject key at the time when the cassette receptacle has substantially been moved from the aforementioned parallel position to the inclined position, whereby the cassette is pushed partially out of the receptacle.

The actuator means may include a first operating lever which is slidable in parallel with the back surface of the chassis and normally biased toward the eject key by means of a spring; an engaging piece provided on the first operating lever; and a connector member having a pair of arms extending substantially perpendicularly with each other. The first operating lever is arranged to the slid forwardly of the eject key against the aforementioned spring by depressing the eject key. One of the arms of the connector member has the free end thereof coupled to the cassette receptacle. The free end of the other arm is adapted to be engaged by the engaging piece provided on the first operating lever. The connector member is mounted for pivotal movement about the base portion thereof.

The cassette push-out means may be constructed as follows. There is provided a second operating lever having an upright portion at the front end thereof. The second operating lever is disposed in overlapping relationship with the first operating lever and connected thereto through a spring so as to be slidable therewith. The foregoing upright portion is formed with a stepped portion at one side thereof. Furthermore, a projection means is provided on the receptacle, and it is arranged to be positioned at a lower level than the stepped portion when the receptacle assumes the aforementioned parallel position and to be moved up to a higher level than the stepped portion at the time when the receptacle has substantially been moved from the parallel position to the inclined position through the depression of the eject key, thereby permitting of a forward movement of the second operating lever, or the upright portion thereof. Still furthermore, a push-out member is mounted on the receptacle for pivotal movement and rotationally biased by a spring. The push-out member has one end thereof disposed in engagement with the upright portion of the second operating level. The other end of the push-out member is adapted for engagement with the rear wall of a cassette when the latter is fully inserted in the receptacle. The push-out member is arranged to be pivotally moved by the aforementioned forward movement of the upright portion of the second operating lever so that the cassette contained in the receptacle is thereby pushed partially out of the receptacle.

The safety mechanism mentioned above may comprise a springbiased slider bar which is slidable in parallel with the row of keys. The slider bar is arranged to be to a position for preventing depression of the eject key and locked thereat by depressing the playback key when the receptacle assumes the parallel position. It is also arranged to be slid to a position for preventing depression of the playback key and locked thereat by depressing the eject key when the receptacle assumes the parallel and the playback key is not depressed.

Other objects, features and advantages of this invention will become apparent from the following description taken in conjunction with the accompanying drawings.

BRIEF DESCRIPTION OF THE DRAWINGS

FIG. 1 is a schematic perspective view showing the interior of the cassette tape recorder according to an embodiment of this invention, wherein FIG. 1B shows the case where the receptacle is located at the position where the cassette is mounted on the reel spindles;

FIG. 2 is a side view showing an example of resiliently operable actuator means which is incorporated in the cassette eject mechanism of this invention, wherein FIG. 2A corresponds to FIG. 1B, FIG. 2B shows the case where the eject key is fully depressed, and FIG. 2C corresponds to FIG. 1A;

FIG. 3 is a bottom view showing an example of means for transmitting the depression of the eject key to the resiliently operable actuator means and cassette pushout means;

FIG. 4 is a plan view showing an example of slider bar constituting the safety mechanism of this invention, wherein

DESCRIPTION OF THE PREFERRED EMBODIMENTS

Figure 1A:
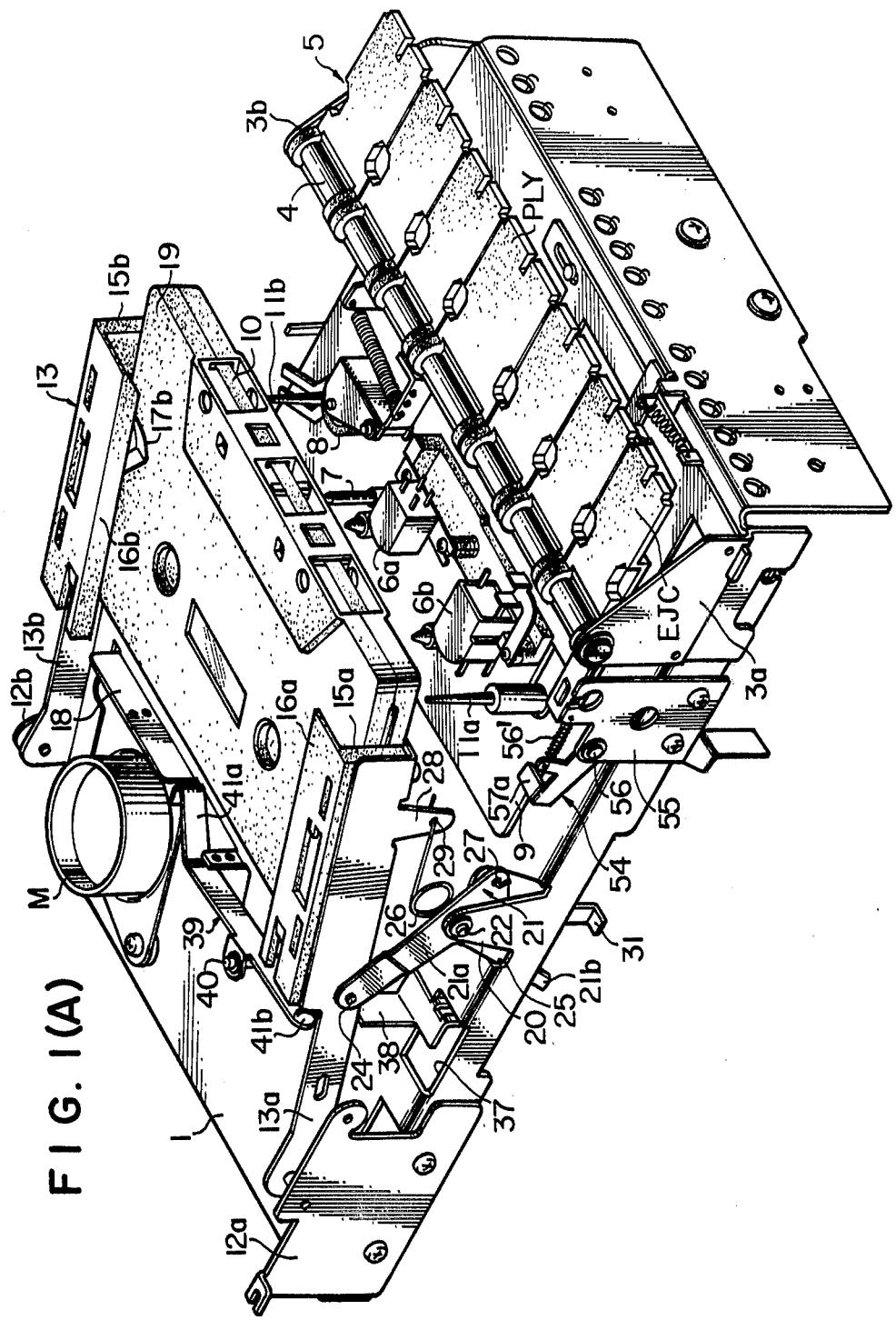
FIG. 1A shows the case where the receptacle is located at the position here a cassette can be inserted into or removed from the receptacle.

Referring first to FIG. 1 of the drawings, there is illustrated the cassette tape recorder embodying this invention, wherein a pair of reel spindles 2a and 2b are provided on a chassis 1, and a row of keys generally indicated at 5 including a playback key PLY and an eject key EJC is depressibly mounted on a common shaft 4 mounted on a pair of brackets 3a and 3b which are attached to the opposite sides of the chassis 1. Between the reel spindles 2a, 2b and the key row 5, there are provided a record-reproduce head 6a, an erase head 6b, a capstan 7, a pinch roller 8 and so forth. The heads 6a, 6b and pinch roller 8 will be slid toward the reel shafts 2a, 2b, together with a subchassis on which the heads and pinch roller are mounted, by depressing the playback key PLY, so that the heads will be brought into contact with a magnetic tape 10 and the pinch roller 8 will be engaged with the capstan 7 through the magnetic tape. References 11a and 11b represent guide pins for the cassette. Reference M represents a motor for rotating the reel spindles 2a and 2b.

Another pair of brackets 12a and 12b are attached to the chassis, and a receptacle member 13 in which the cassette is removably received, is pivotally secured to these brackets through a pair of arms 13a and 13b. The receptacle member 13 comprises a bottom wall 14 formed with apertures (not shown) through which the reel shafts can be inserted, a pair of side walls 15a and 15b having the top portions bent inwardly as indicated by 16a and 16b respectively and provided with leaf springs 17a and 17b (only 17b is shown) which extend slantly with respect to the bottom wall 14 respectively, and a partial back wall 18. The front portion of the receptacle member 13 is open so as to receive the cassette as shown at 19 in FIG. 1A. The receptacle member 13 is caused, by depressing eject key, to assume a position inclined through a predetermined angle with respect to the chassis, as shown in FIG. 1A, so that the cassette can be inserted into or removed from the receptacle. This can be achieved by the action of the cassette eject mechanism of this invention which will fully be described hereinafter.

As shown in FIG. 1B, the cassette 19 is further inserted into the receptacle member 13 against the forces of the leaf springs 17a and 17b until the rear wall thereof contacts the back wall 18 of the receptacle, and thereafter the receptacle 13 is depressed to be pivotally moved from the inclined position shown in FIG. 1A to a position substantially parallel to the chassis 1.

Under such a condition as shown in FIG. 1B, by depressing the playback key PLY, the subchassis 9 will be forwardly slid so that the heads 6a, 6b and pinch roller 8 which are mounted thereon will be brought into engagement with the magnetic tape 10 and capstan 7 respectively, as mentioned earlier. In this case, the playback key PLY will be locked at the depressed position by lock means (not shown).

The main portions of this invention will now be described with reference to FIG. 2 through 6.

As illustrated in FIG. 2A, a connector member 21 is pivotally secured by a pin to an upright bracket 20 provided at one side of the chassis. The connector member 21 comprises a pair of arms 21a and 21b which extend substantially perpendicularly with respect to each other. The condition as shown in FIG. 2A corresponds to that of FIG. 1B wherein the receptacle member 13 is at the horizontal position which is parallel to the chassis, and none of the keys is depressed. One of the arms 21a of the connector member 21 has its free end anchored to one of the side walls, 15a of the receptacle member 13 by means of a pin 24 which is inserted in an elongated aperture 23 in the side wall 15a in such a manner as to be movable therealong. The free end of the other arm 21b extends below the chassis 1 through an elongated aperture 25 formed in the chassis. Furthermore, the connector member 21 is connected to the receptacle member 13 by means of a spring 26. This spring 26 has one end thereof rotatably anchored at an aperture 27 formed in the base portion of the connector member 21. The other end of the spring 26 is also rotatably anchored at an aperture 29 which is formed in a lug 28 extending from the receptacle member 13. In this case, it will be seen that the pivot pin 22 of the connector member is positioned between the pin 24 and the aperture 27, and closer to the latter.

Under the condition of FIG. 2A, the arm 21b of the connector member 21 is vertical, with the free end thereof disposed in engagement with a vertical engaging piece 31 provided integrally with a first operating lever 32 (see FIG. 3) which is slidably provided on the back surface of the chassis 1.

As will be seen from FIG. 3, the first operating lever 32 is biased toward the leg 34 of the eject key EJC by means of a spring 33. A second operating lever 35 is provided in underlying relationship to the first operating lever 32. These two levers are connected to each other by means of a spring 36. The front end portion of the second operating lever 35 extends above the chassis 1 through an aperture 37 formed in the chassis, thus constituting an upright portion 38, the function of which will be described later.

Figure 5A:
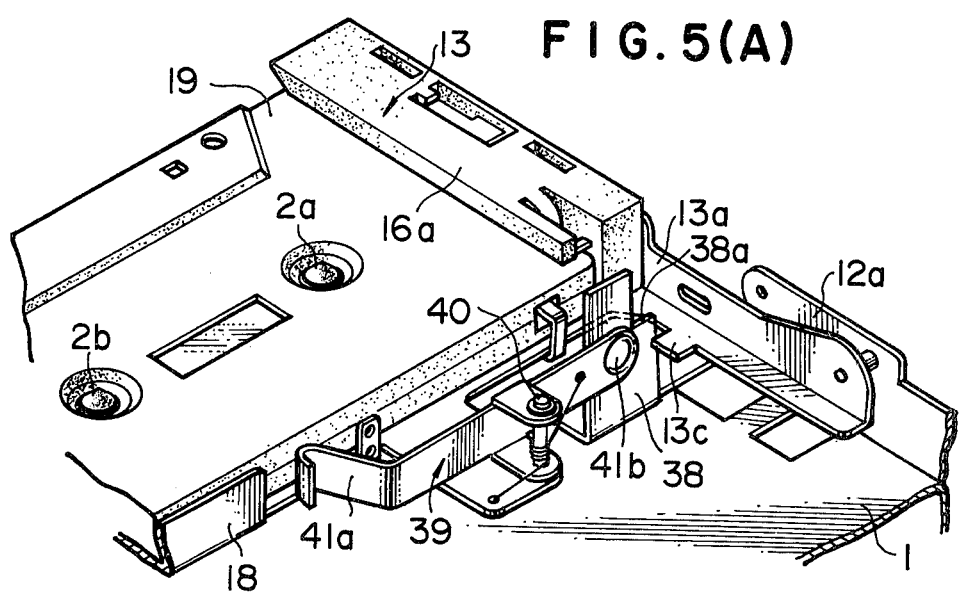
FIG. 5A, B and C are fragmentary perspective views partly in section useful for explaining operation of the cassette pushout mechanism of this invention.

Referring again to FIG. 1, a cassette push-out member 39 is mounted by a pin 40 on the receptacle member 13 adjacent the back wall 18 thereof in such a manner as to be pivotally movable in a plane which is substantially parallel to the bottom wall of the receptacle member 13. One end of the pushout member 39 is bent as indicated at 41a, and the other end thereof is provided with a semi-spherical member 41b which contacts the upright portion 38 of the second operating lever 35. The push-out member is rotationally biased by means of a spring (not shown) so that the bent end portion 41a thereof extends beyond the back wall 18 slightly into the receptacle 13. As shown in FIG. 5, the second operating lever 35 has a stepped portion 38a formed at one side thereof. On the arm 13a of the receptacle, there is provided an inwardly extending projection 13c which is adapted for cooperation with the stepped portion 38a of the second operating lever, as will be described in detail hereinafter.

As illustrated in FIG. 4, a slider bar 42 is provided under the key row 5, and which is slidable on the upper surface of the chassis along the key row. This slider bar 42 comprises an elongated bar-like portion 43 which extends in parallel with the key row 5, and a pair of branch portions 44a and 44b which extend toward the heads 6a and 6b substantially perpendicularly with respect to the elongated bar-like portion 43. One of the branch portions, 44a is formed at the front end with a pair of oppositely slant portions 45a and 45b. The slant portion 45a is adapted to be engaged by the leg 34 of the eject key EJC, and the one 45b is adapted to be engaged by the leg of a record key. The other branch portion 44b is also formed at its front end with a similar slant portion 45c which is adapted to be engaged by the leg 46 of the playback key PLY. At the bases of these slant portions 45a, 45b and 45c are formed right-angle portions 47a, 47b and 47c respectively. A rotary lever 48, which is disposed between the branch portions 44a and 44b, is rotatably mounted on the chassis 1 by means of a spring 49. A spring 52 is interposed between an upright piece 50 provided at the free end of the rotary lever 48 and an upright piece 51 provided on the slider bar 42; thus, the rotary lever 48 is biased by the spring 52 clockwise as viewed in FIG. 4 so as to be disposed in engagement with an upright piece 53 provided on the elongated bar-like portion 43 of the slider bar 42, with a result that the latter is also biased to the left. In this case, the biasing of the rotary lever 48 and slider bar 42 is limited by the fact that the rotary lever 48 has its front end engaged with an upright piece 54' provided on the chassis.

Referring once again to FIG. 2, a lock member 54 is provided ahead of the eject key, and which is pivotally mounted by a pin 56 on an upright mount 55 attached to one side of the chassis 1. It is also connected to the upright mount 55 by means of a spring 56'. This lock lever 54 has horizontal projections 57a and 57b provided at the opposite ends thereof respectively. The horizontal projection 57a is located below the receptacle 13 at a position engageable therewith, and the horizontal projection 57b is adapted to be engaged or disengaged with an upright piece 58 provided at one end of the slider bar 42.

In order to remove the cassette 19 when the latter is mounted on the reel spindles 2a and 2b as shown in FIG. 1B, the eject key EJC is depressed as shown in FIG. 2B, whereupon the first operating lever 32 will be forwardly moved against the spring 33 by the leg 34 of the eject key EJC as will be seen from FIG. 2B, so that the arm 21b of the connector member 21 will be pushed by the engaging piece 31 of the first operating lever 32 so that the connector member 21 will be turned clockwise about the pin 22, and at the same time the spring 26 will be turned anticlockwise; thus the respective elements will be momentarily made to assume the positions as shown in FIG. 1A, resulting in the receptacle 13 being inclined. In this case, when the respective elements reach such positions, the projection 13c provided on the support arm 13a of the receptacle member 13, which has been at a lower level than the stepped portion 38a of the upright portion 38 under the condition of FIG. 2A which corresponds to that of FIG. 1B, will be moved up to a higher level than the stepped portion 38a, thus permitting of a forward movement of the stepped portion 38. Under such a condition, if the eject key EJC is further depressed as shown in FIG. 2B, then the second operating lever 35 will be slid forwardly, together with the first operating lever 32, so that the stepped portion 38a will be moved directly beneath the projection 13c as indicated in FIG. 5B. Thus, the push-out member 39 will be pushed at the contact member 41b thereof by the upright portion 38a of the second operating lever so as to be rotated about the pin 40, and as a result the bent end portion 41a of the push-out member 39 will be caused to collide with the rear wall of the cassette 19, whereby the latter will be pushed partially out of the receptacle member 13, as will be appreciated from FIG. 2B, for example. In this way, the cassette 19 will become ready to be removed from the receptacle member 13. Thereafter, by releasing the eject key EJC, the push-out member 39 will be automatically returned to the original position, and thus the positional relationship between the stepped portion 38a and the projection 13c will become as shown in FIG. 5C.

Figure 4A:
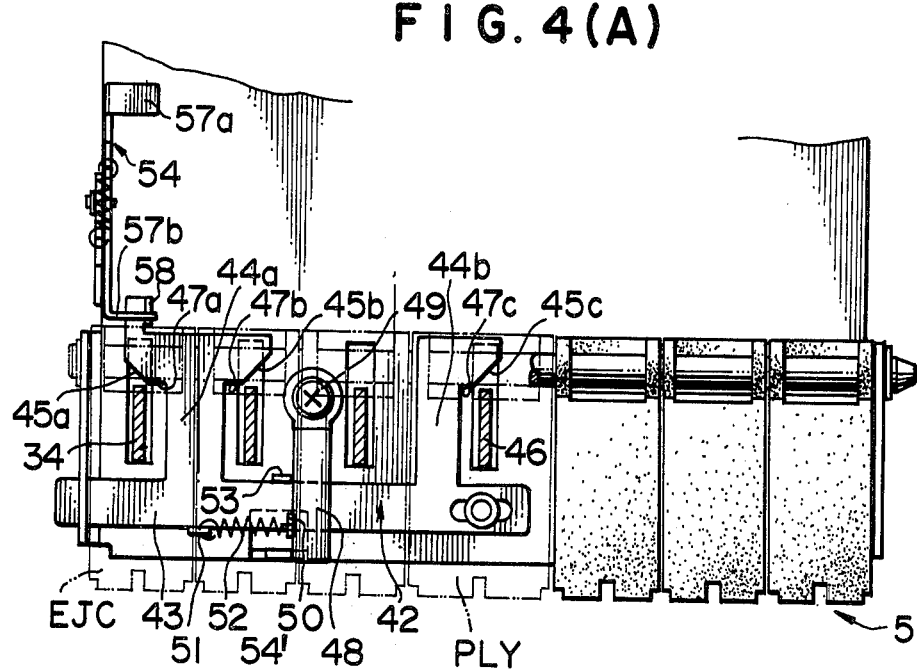
FIG. 4A shows the position assumed by the slider bar when receptacle is located at the position of FIG. 1B and neither the eject key nor playback key is depressed.
Figure 4B:
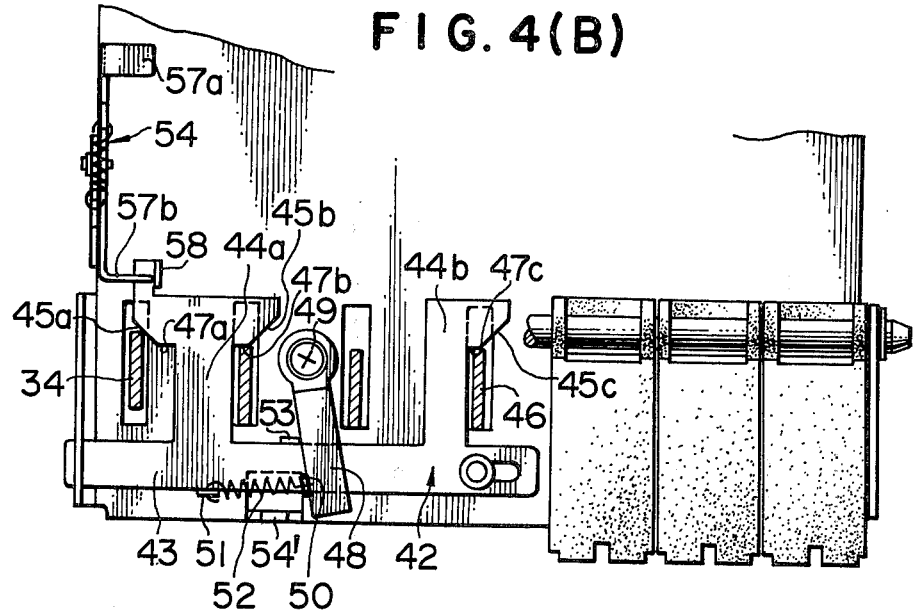
FIG. 4B shows the position assumed by the slider bar when the eject key is depressed so that the receptacle is caused to assume the position of FIG. 1A.

When the eject key EJC is depressed as mentioned just above, the leg 34 thereof will be forwardly swung in engagement with the slant portion 45a of the slider bar 42, so that the latter will be slidden from the position of FIG. 4A to the position of FIG. 4B and the upright piece 58 provided on the slider bar 42 will be engaged by the horizontal projection 57b of the lock member 54; consequently, the slider bar will be locked at the position as shown in FIG. 4B. When the slider bar assumes such a position, the playback key PLY is prevented from being depressed since right-angle portion 47c of the slider bar 42 is disposed in engagement with the leg 42 of the playback key PLY.

Figure 4C:
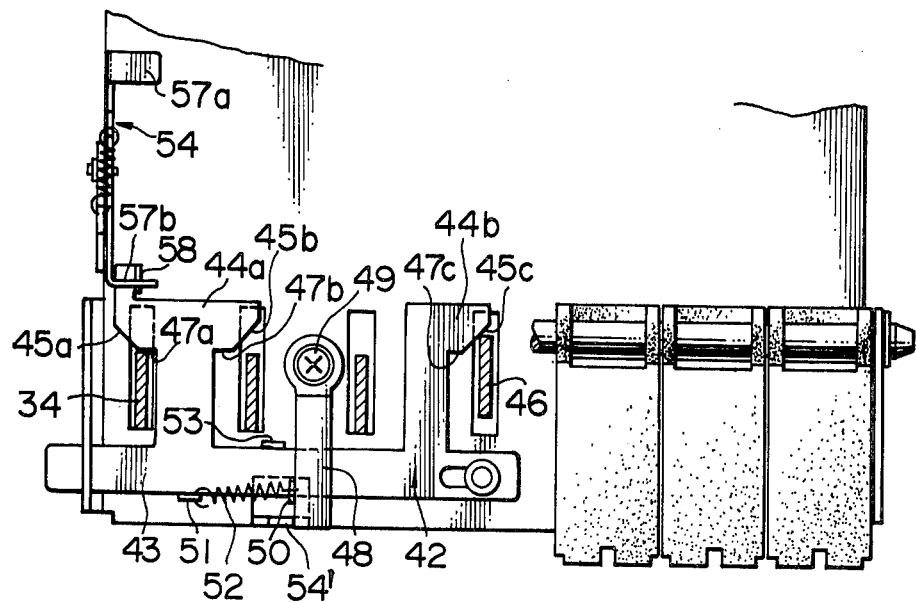
FIG. 4C shows the position assumed by the slider bar when the playback key is depressed with the receptacle located at the position of FIG. 1B.

On the other hand, under the condition of FIG. 1B, if the playback key PLY is depressed, then the leg 46 thereof will be swung forwardly in engagement with the slant portion 45c of the slider bar 42, so that the latter will be slid from the position of FIG. 4A to the position of FIG. 4C. At this time, the playback key PLY will be locked in the depressed position by lock means (not shown), and thus the slider bar will be locked at the position of FIG. 4C due to the fact that the fore end of the slant portion 45c thereof is engaged by the leg 46 of the playback PLY. In this case, the eject key EJC is prevented from being depressed due to the fact that the leg 34 thereof is engaged with the right-angle portion 47a of the slider bar 42.

As will be appreciated from what has been described above, in accordance with this invention, it is possible to enable the cassette receptacle to positively assume the position where a cassette can readily be inserted into or removed from the receptacle, by using the aforementioned resiliently operable actuator means. Furthermore, it is possible to avoid occurrence of trouble due to pushing-out of the cassette, since the latter is not pushed out until the receptacle accommodating the same has substantially reached the inclined position as mentioned above. Still furthermore, it is also possible to avoid trouble due to erroneous depression of a key or keys, by virtue of the fact that the eject key cannot be depressed when the playback key is in the depressed position while the playback key cannot be depressed when the receptacle member assumes the position where the cassette can be inserted into or removed from the receptacle.

While the present invention has been described with respect to some specific embodiments thereof, it is to be understood that the foregoing description is only exemplary of the invention and various modifications and changes may be made therein within the spirit and scope of the invention as defined in the appended claims.

We claim:

1. In a cassette tape recorder having a chassis, a pair of reel spindles for removably mounting thereon a magnetic tape cassette, drive means for rotating said reel spindles, a plurality of depressible operable keys, including at least playback key and an eject key, which are arranged in a row along one side of said recorder, magnetic head means adapted to be brought into engagement with a magnetic tape in said cassette by depressing said playback key, means for locking said playback key in the depressed position, and cassette receptacle means mounted for pivotal movement between a position inclined through a predetermined angle with respect to said chassis where said cassette can be inserted into or removed from said cassette receptacle means and a position substantially parallel with respect to said chassis, the improvement comprising a cassette eject mechanism which comprises, in combination:

resiliently operable actuator means comprising a first slide member slidable along a surface of said chassis and normally biased toward said eject key by means of a spring, said first slide member being arranged to be slid forwardly of said eject key against said spring by depressing said eject key, an engaging piece provided on said first slide member, a connector member having a pair of first and second arms extending substantially perpendicularly with respect to each other and a base portion through which said first and second arms are integrally connected with each other, said connector member being rotatably attached at a first position to an upright bracket provided on said chassis, said first position being in or adjacent to said base portion, said connector member being also movably coupled at a second position to said cassette receptacle means, said second position being adjacent to the free end of said first arm, the free end of said second arm being adapted to be engaged by said engaging piece, and a toggle spring means having one end thereof coupled to said connector member at a third position adjacent to the end of said base portion, said first position being between said second position and said third position but closer to said third position, the other end of said spring being coupled to said cassette receptacle means, wherein when said cassette receptacle means is in said parallel position, said connector member is positioned so that said first and second arms thereof are respectively substantially parallel and perpendicular to said chassis while said spring means is compressed wherein said connector member and said cassette receptacle means are maintained in said positions respectively, and wherein when said eject key is depressed, said second arm is pushed by said engaging piece so that said connector member is rotated in one direction against the action of said spring means and at the same time said toggle spring means is rotated in the opposite direction while being expanded, as a result of which said cassette receptacle means is moved from said parallel position to said inclined position; and cassette push-out means comprising a second slide member provided with an upright portion at the front end thereof, said second slide member being disposed in overlapping relationship with said first slide member and connected thereto through a spring so as to be slidable therewith, a stepped portion formed in said upright portion at one end thereof, an inwardly directed projection means provided on said cassette receptacle means, said inwardly directed projection means being arranged to be positioned at a lower level than said stepped portion when said receptacle means is in said parallel position and to be moved up to a higher level than said stepped portion at the time when said receptacle means has substantially been moved from said parallel position to said inclined position through the depression of said eject key, thereby permitting of a forward movement of said upright portion, and a push-out member mounted on said receptacle means for pivotal movement and rotationally biased by a spring, one end of said push-out member being disposed in engagement with said upright portion of said second operating lever, the other end of said push-out member being adapted for engagement with the rear wall of the cassette which is fully inserted in said receptacle means, said push-out member being arranged to be pivotally moved by said forward movement of said upright portion so that said cassette is thereby pushed out of said receptacle means.

2. The improvement of claim 1, wherein said cassette eject mechanism further comprises safety means comprising a spring-biased slider bar slidable in parallelism with said row of keys, said slider bar being arranged to be slid to a position for preventing depression of said eject key and locked thereat by depressing said playback key when said receptacle means is in said parallel position, said slider bar being also arranged to be slid to a position for preventing depression of said playback key and locked thereat by depressing said eject key when said receptacle means is in said parallel position and said playback key is not depressed.

* * * * *